UNITED STATES PATENT OFFICE.

KEIZO SAKURAI, OF SAN FRANCISCO, CALIFORNIA.

FIREPROOF MATERIAL.

No. 852,908.  Specification of Letters Patent.  Patented May 7, 1907.

Application filed April 5, 1906. Serial No. 310,023.

*To all whom it may concern:*

Be it known that I, KEIZO SAKURAI, a citizen of Japan, residing in the city and county of San Francisco and State of California, have invented new and useful Improvements in Fireproof Materials, of which the following is a specification.

My invention relates to the manufacture of brick and its object is to make a cheap and perfect fire-brick from certain materials which heretofore have not been deemed capable of use in combination for the purpose.

The invention broadly comprehends the mixing of a suitable vehicle as chrome iron ore, magnesite, sand, infusorial or diatomaceous earth, etcetera, with an easily fusible binding material, subjecting this mixture to a suitable high pressure and baking at a suitable temperature.

It is usual in the manufacture of fire-brick to employ fire clay as a binder; the fire clay being comparatively pure and containing very little alkaline and metallic oxid.

It has not been deemed possible heretofore to make fire-brick with an easily fusible binder, such as common clay. But I have discovered that I can produce a good, cheap, commercial fire-brick, if the original refractory material is first reduced to two forms, one a coarse granular mass and the other a fine powder, and then suitable proportions of the coarse and fine stuff are taken and mixed with a suitable proportion of common clay or other easily fusible binder, molded under very high pressure and then baked at suitable temperature. Conversely I am able to take clay containing too great a proportion of binding or fusible material to make perfect fire-brick and render it available by the admixture in suitable manner some high refractory material like kaolin, infusorial or diatomaceous earth, powdered sand, or the like, which will do no harm to the clay when baked. Also I have discovered that if bricks are made with infusorial or diatomaceous earth, or argillaceous material having high refractory nature, together with a fusible binding material and subjected to high pressure in a suitable mold or press, that these bricks after baking, become very light, strong and fire proof.

Among the advantages of my process are—
(1) These bricks need no particular drying operation before baking, because comparatively little water is used in molding. (2) They do not need the same high-temperature-bake like other fire bricks: the temperature is only enough to fuse the binder and the amount of binder is limited to just enough to bind permanently the particles into a coherent resistant mass. (3) They are capable of successfully withstanding sudden heating and cooling. (4) They do not contract or expand unduly when heated to high temperature, and do not crack.

In practicing the invention there are many binders suitable for the purpose, such for example as alkaline and metallic oxids and silica, or alkaline silicate and metallic silicate; and these may be used either singly or in combination; but I prefer an easily fusible clay binder.

The high pressure to which the mixture is submitted before baking is most essential, as without it I do not get the desired results. The pressure must be such as apparently to weld the particles into a cohesive mass.

The following formulæ show the application of the invention, and indicate its variations:

(1) To make brick from chrome iron ore. Coarse granular chrome (20 to 30 mesh) 50%, fine powdered chrome (150 to 200 mesh) 40%, easily fusible binder as clay, 10%, sufficient water to render plastic, press at 5,000 to 6,000 lbs. per sq. in., bake until the binder is vitrified 1,000° to 1,200° C. more or less.

(2) To make brick from magnesite: First remove $CO_2$ or other vaporizable ingredients from the magnesite by baking at high heat (not less than 1,500° C. and sometimes 2,000° C. or more). Most magnesite ore contains more or less silica which causes the material to contract with high temperature. It is therefore necessary, or at least desirable, to bake the magnesite containing silica to a higher temperature than the temperature which the finished brick in its uses will likely be subjected to. Then take of this suitably baked granulated magnesite (20 to 30 mesh) 40% to 45%, baked powdered magnesite (150 to 200 mesh) 40%, easily fusible clay 15% to 20%, sufficient water to render plastic, press to 4,000 to 5,000 lbs. per sq. inch and dry; bake till binder melts at 1,000° to 1,200° C. more or less.

(3) To make fire-bricks from sand. Pure granulated sand (20 to 30 mesh) 45% to 50%, powdered sand or infusorial or diatomaceous earth (150 to 200 mesh) 40%, easily fusible clay 10% to 15%; sufficient water to render plastic; press at 5,000 to 6,000 lbs. per sq. in.; bake until the binder melts at 1,000° to 1,200° C., more or less.

(4) To make fire brick from infusorial or diatomaceous earth as a vehicle. (a) Take high fire refractory infusorial or diatomaceous earth (which is a powder) 80%, fusible clay 20%, suitable water to render the mass plastic; press at 4,000 to 5,000 lbs. per sq. in. Bake as before. (b) If the vehicle has any considerable tendency to expand or contract take— pure coarse sand (20 to 30 mesh) 50%, infusorial or diatomaceous earth 30%, fusible clay 20%, water to make plastic—pressure at 4,000 to 5,000 lbs. per sq. in. Bake as before. (c) If the vehicle contains any organic matter or other vaporizable ingredients which have a tendency to expand or contract in baking, first remove this injurious matter by baking at suitable heat. (This baking has the effect of uniting the powdered particles of certain qualities of diatomaceous infusorial earth, such for example as contains calcium or iron, and this must be ground up before using). Coarse baked infusorial or diatomaceous earth (20 to 30 mesh) 50% powdered baked infusorial or diatomaceous earth (150 to 200 mesh) 30%, fusible clay 20%, water to make plastic, pressure at 4,000 to 5,000 lbs. per sq. in., bake as before.

Having thus described my invention, what I claim and desire to secure by Letters Patent, is—

1. A fire refractory material comprising a refractory vehicle in two forms, one a coarse granular mass and the other a fine powder, suitable proportions of this fine and coarse stuff being mixed with a suitable proportion of an easily fusible binder and water, subjected to high pressure and baked.

2. A new article of manufacture consisting of baked granulated magnesite, baked powder magnesite, easily fusible clay and water, subjected to a high pressure, and baked.

3. A process of producing a fire refractory material, which comprises heating a suitable refractory medium containing vaporizable ingredients to a point sufficient to remove said ingredients and reducing this heated refractory medium to two forms, one a coarse granular mass and the other a fine powder, taking suitable proportions of the coarse and fine stuff and adding suitable easily fusible binder and water, submitting the mixture to high pressure to weld the particles into a cohesive mass, and baking.

4. A fire-proof material consisting of suitable proportions of suitably granulated, and finely powdered refractory matter, such as described, mixed with a suitable proportion of an easily fusible clay, said mixture submitted to high pressure and then baked to a temperature sufficient only to fuse the clay and bind the particles together.

5. A fire-proof material comprising approximately 40% of a coarse granular fire-proof vehicle, approximately 20 to 30 mesh, approximately 40% of the same in powdered form, approximately 150 to 200 mesh, approximately 20% of an easily fusible binder and sufficient water to make a paste, said paste subjected to a pressure of approximately 5,000 pounds to the square inch, and this pressed product baked to approximately 1,000° C.

In testimony whereof I have hereunto set my hand in presence of two subscribing witnesses.

KEIZO SAKURAI.

Witnesses:
 WM. J. GORMAN,
 D. B. RICHARDS.